United States Patent [19]

Russell

[11] Patent Number: 5,058,370
[45] Date of Patent: Oct. 22, 1991

[54] YARD RAKE WITH PICK-UP HEAD

[76] Inventor: Elsie M. K. Russell, Rte. 2, P.O. Box 198 R, Franklinton, La. 70438

[21] Appl. No.: 562,848

[22] Filed: Aug. 6, 1990

[51] Int. Cl.⁵ .............................................. A01D 7/06
[52] U.S. Cl. .............................. 56/400.12; 56/400.16; 56/400.19
[58] Field of Search ........... 56/400.04, 400.11, 400.12, 56/400.16, 400.18, 400.19, 400.2

[56] References Cited

U.S. PATENT DOCUMENTS

| | | | |
|---|---|---|---|
| 2,891,374 | 6/1959 | Richmond | 56/400.12 |
| 3,601,966 | 8/1971 | Kerry | 56/400.12 |
| 3,688,484 | 9/1972 | Cox | 56/400.12 |
| 4,037,397 | 7/1977 | Fiorentino | 56/400.12 |
| 4,292,794 | 10/1981 | Gascon | 56/400.16 |
| 4,378,671 | 4/1983 | Gascon | 56/400.04 |

Primary Examiner—Terry L. Melius

[57] ABSTRACT

A pick-up head is hingedly attached to the rear side of a lawn rake making lawn work easier and more convenient. The arm attached to the pick-up head is pushed into a clamp on the rear side of the rake handle. This clamp holds the pick-up head assembly secure in an upright, storage position while allowing normal raking. When pick-up is desired, the arm is pulled forward releasing it from the clamp and manually pushes the pick-up head into position adjacent the main rake head thus compressing debris between the two heads. The debris may be released by returning the assembly back into the original upright position.

3 Claims, 2 Drawing Sheets

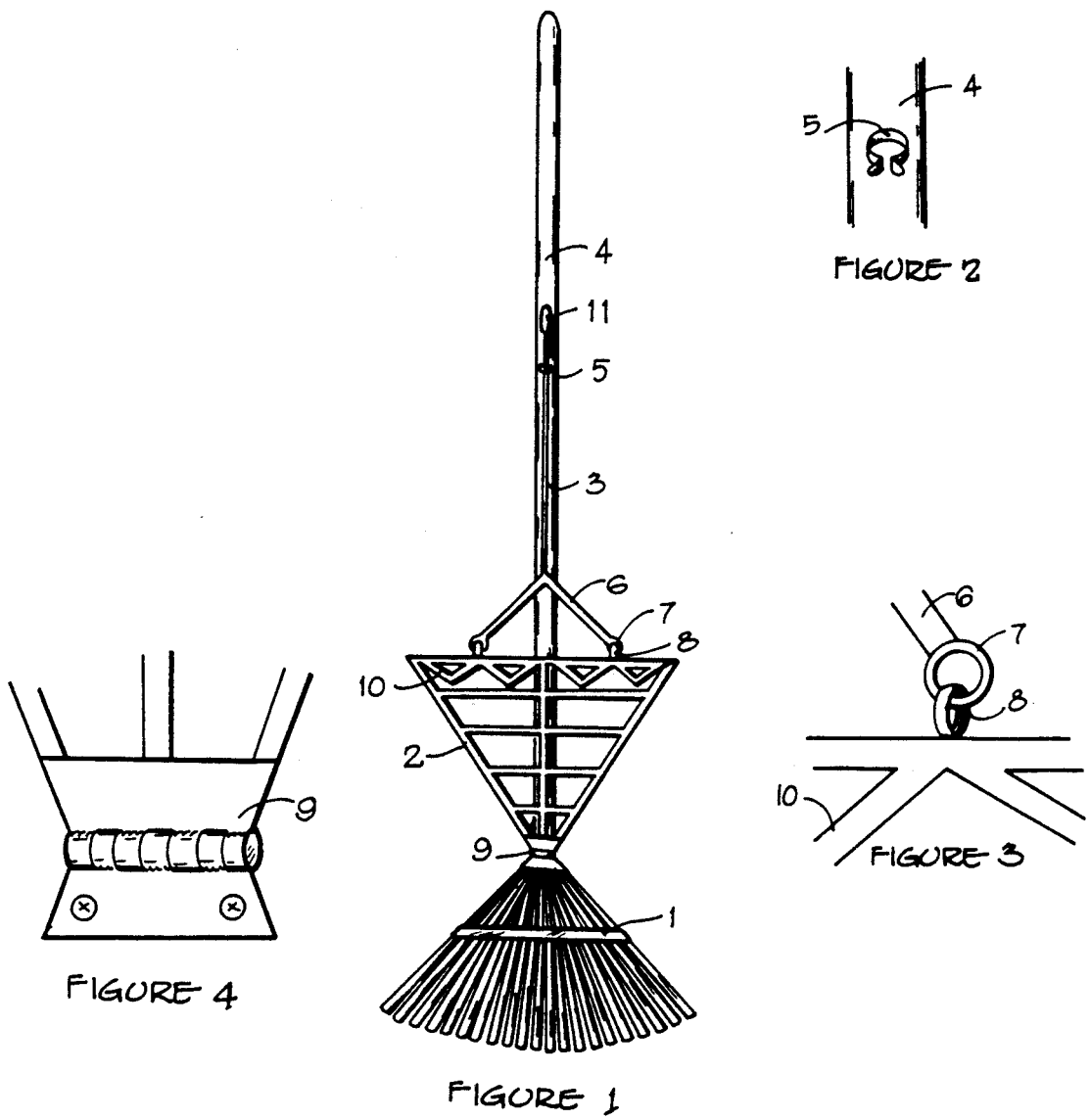

YARD RAKE WITH PICK-UP HEAD

BACKGROUND OF THE INVENTION

1. Field of the Invention

The present invention relates in general to gardening tools and in particular to a lawn rake with a pick-up head attachment.

2. Prior Art

In doing yard work, there is a need for a device to aid in leaf and debris pick-up, that can be simply and inexpensively manufactured, and allows normal raking until a pick-up position is reached. The device must be simple to operate with the very minimum of effort and time. It must pick up and maintain the debris until a desired location is reached. Therefore, by not having to put a hand on the debris, it will lessen the bodily exposure to insects and spiders that take refuge in fallen leaves and other debris.

U.S. Pat. No. 3,688,484 allows pick-up but is awkward in handling and inefficient, as is U.S. Pat. No. 4,378,671.

No device is known, however, that is simple, lightweight, easy to operate, and that aids in the efficiency of time and labor involved with yard work.

SUMMARY OF THE INVENTION

The principal object of the present invention is to provide a simple, mechanical device for easy use in pick-up of leaves or other debris, and lessening the bodily exposure to insects and spiders harbored in the debris.

It is also an object of the present invention to provide such a device which is of simple, inexpensive construction.

Another object is to increase efficiency of the lawn rake, reducing labor and time associated with yard work.

The foregoing objects can be accomplished by improving the existing yard rake with an additional lightweight, auxiliary head attached to the main rake head with a hinge, and remaining in an upright, storage position when not in use. Attached to the auxiliary pick-up head is a movable arm which remains in a vertical position, adjacent to the main rake handle, when not in use. When pick-up is desired, the arm is easily moved into position and manually compresses the leaves, debris, etc., between the auxiliary pick-up head and the main rake head, allowing for easier loading or moving of the debris.

BRIEF DESCRIPTION OF THE DRAWINGS

FIG. 1 is a rear view of the main rake and the attached auxiliary pick-up assembly retained in an upright storage position.

FIG. 2 is an enlarged fragmentary, top perspective of the clamp which holds the arm, attached to the auxiliary head, in a secure, upright position when not in use.

FIG. 3 is an enlarged fragmentary of the pivotal point of the auxiliary head and the arm, detailing a circular ring construction allowing ease of movement of the auxiliary head.

FIG. 4 is an enlarged fragmentary of the hinge attaching the auxiliary head to the main rake head.

DETAILED DESCRIPTION

Figure 5:
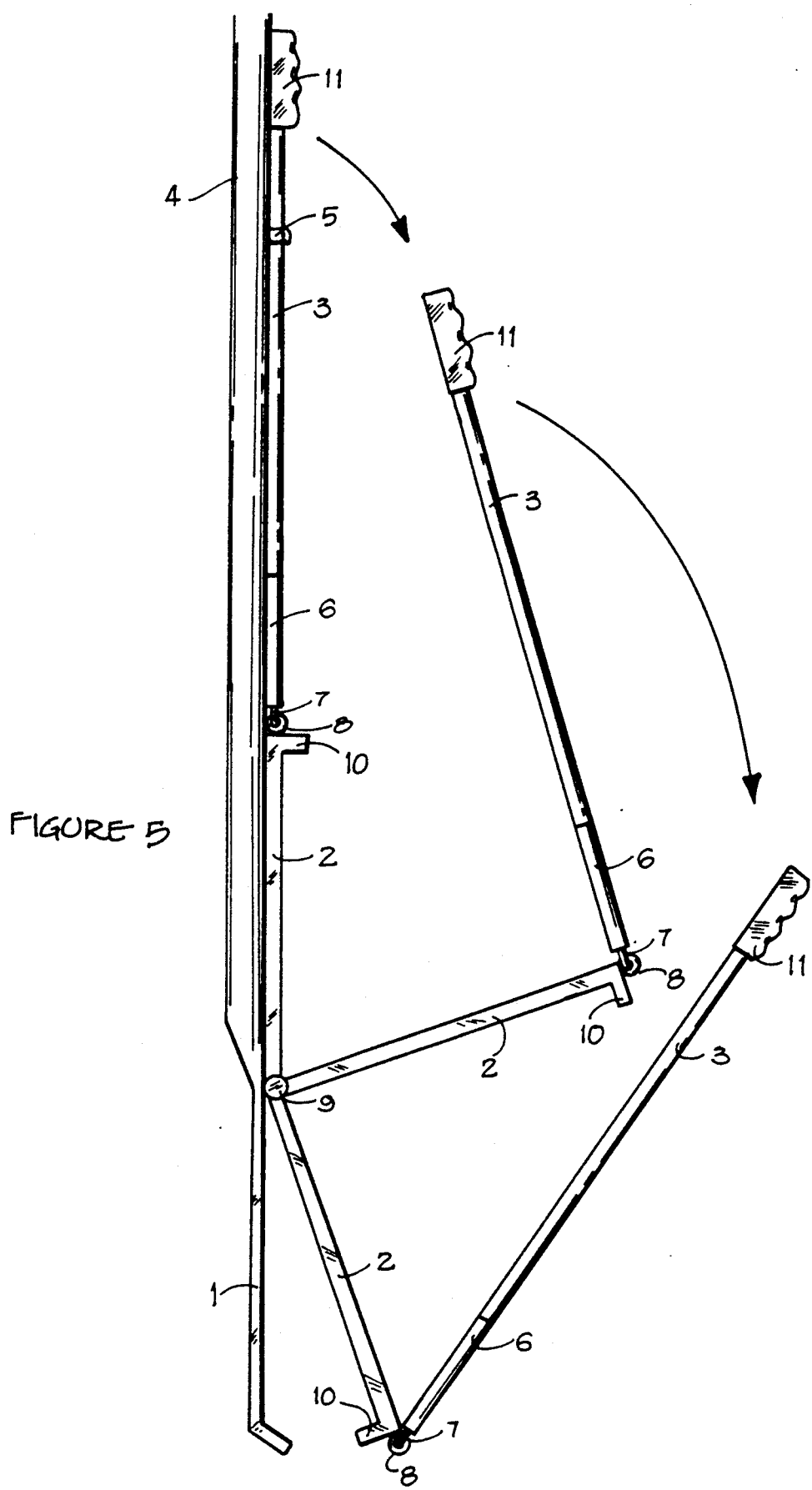
FIG. 5 is a side perspective of the auxiliary head assembly attachment to the main rake shown at the upright, storage position and two other positions 12 and 13 during pick-up operation.

As shown in the drawings, the invention is an improvement of the existing yard rake comprising the main rake head 1 and an auxiliary pick-up head 2 and arm 3, attached to the rear side of the main rake handle 4, which remains in an upright storage position with a single clamp 5, as seen in FIG. 2. The arm 3 divides and forms a Y 6, to allow for greater control of the auxiliary head 2 and is attached to said head, as best seen in FIG. 3, with two circular rings 7 and 8 to allow ease in movement up or down during pick-up operation. The auxiliary head 2 is attached to the rear side of the main rake head 1 with a simple hinge 9, as seen in FIG. 4, which also allows for ease of movement up or down.

As seen in FIG. 5, the projectory edge 10 of the auxiliary head opposite the hinge, extends outward, insuring more containment of debris.

The pick-up rake head assembly remains in an upright, storage position, allowing for normal raking until a desired pick-up position is reached, when the handle 11 on the free end of the arm 3 is pulled forward releasing it from the stationary clamp 5 and allowing the auxiliary head to be lowered and thus resulting in the leaves, debris, etc., to be compressed between the two rake heads 1 and 2. The debris may be easily moved to a desired location and released by returning the auxiliary head assembly back into the original upright position, as seen in FIG. 1.

It will be apparent that modifications in accordance with the present invention can be made by those skilled in the art without departing from the scope of the invention and the invention is not to be considered limited to what is shown in the drawings and described in the specification.

I claim:

1. A lawn-working device comprising:
   a. a main rake head with a plurality of tines,
   b. an elongated rake handle, said main rake head connected to said rake handle to permit normal raking,
   c. an auxiliary pick-up rake head having a rear edge hingedly attached to the rear edge of the main head and carried by the same handle,
   d. an elongated arm connected to the auxiliary head on the edge opposite the hinge and used as a means to activate the auxiliary head into a pick-up position adjacent the rear edge of the main head, thus, with selective manual force enclosing debris between the two heads, and
   e. a stationary clamp attached to the rear of said handle used as a means to secure the elongated arm and auxiliary head in a stable, upright, storage position during normal raking.

2. The lawn-working device of claim 1, in which the elongated arm comprises:
   a. a right angle division with respect to the auxiliary head at the connected end thereof and being connected to said auxiliary head by means of two adjoined circular rings allowing for ease of manual compression of the auxiliary head, and
   b. a form-fit grip on the free end to allow for comfortable grasp and movability.

3. The lawn-working device of claim 1, in which the auxiliary head comprises:

a. an enclosed, projectory edge opposite the hinge, used as a means to insure greater containment of debris, and b. horizontal bars increasing in length from the hinge to the projectory edge, measurably placed, to restrain debris, and c. a vertical bar extending from the center of the hinge to the center of the projectory edge for stability.

* * * * *